June 4, 1963 H. A. GREEN 3,092,445
RECOVERY OF URANIUM FROM LIGNITE
Filed Oct. 21, 1958
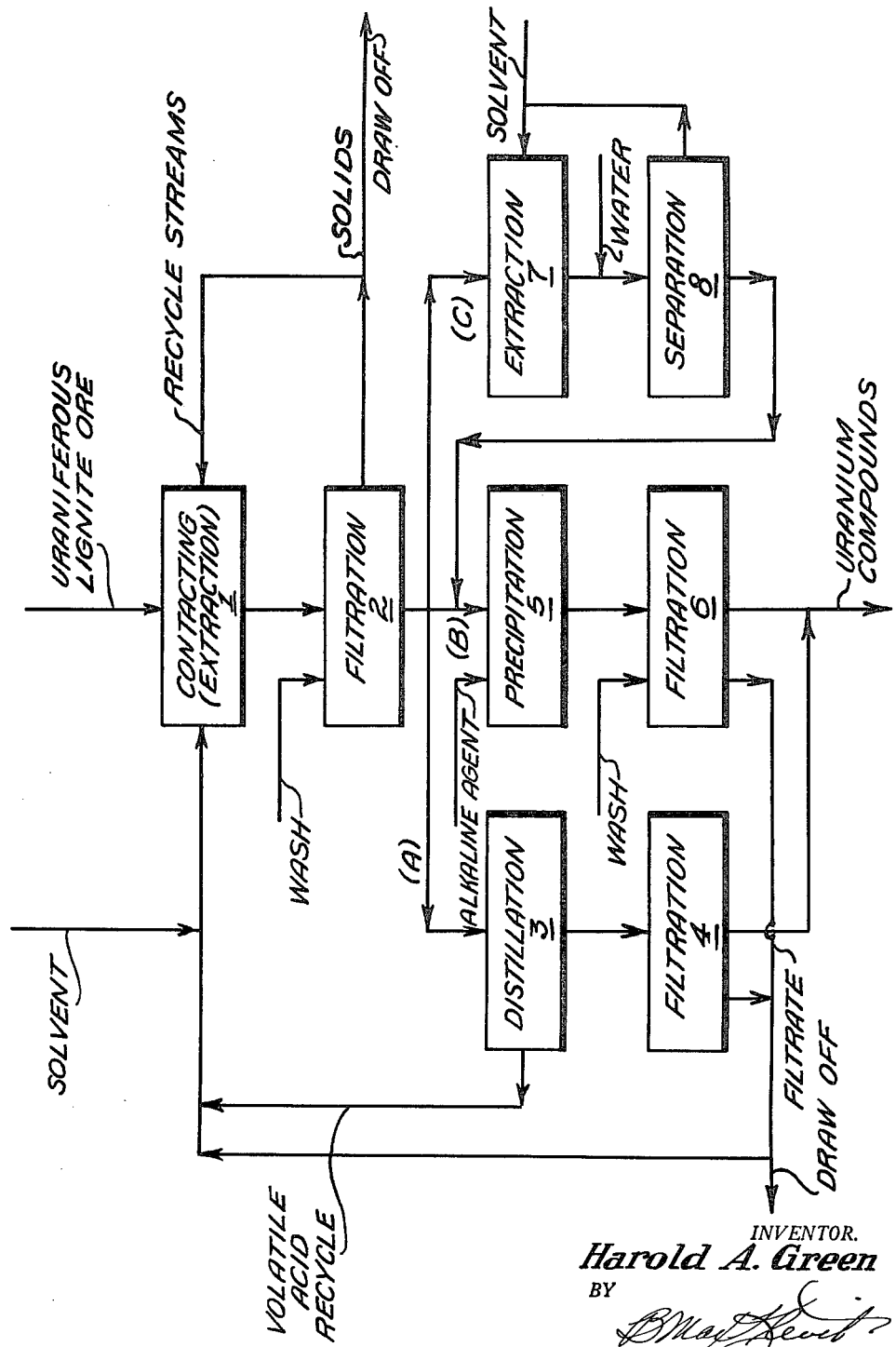
INVENTOR.
*Harold A. Green*
BY
*ATTORNEY.*

3,092,445
RECOVERY OF URANIUM FROM LIGNITE
Harold A. Green, Elkins Park, Pa., assignor to Air Products and Chemicals, Inc., a corporation of Delaware
Filed Oct. 21, 1958, Ser. No. 768,680
4 Claims. (Cl. 23—14.5)

This process is directed to the recovery of uranium compounds from ores of uranium. It is more particularly directed to the recovery of uranium compounds from uncalcined lignite by a selective solvent extraction process.

The critical need for uranium in recent years has made the efficient recovery of uranium of primary importance. A particularly valuable development would be a process for the recovery of uranium from low grade ores and especially those, such as lignite, having at least 0.1% uranium and having appreciable reactivity with acids. Up to the present time it has not been feasible to process these by conventional aqueous acid extraction because of the excessive acid consumption and high costs involved. This consumption of acids is due to the presence of inorganic alkalinity directly relatable to the oxide or carbonate content of the ore, or to an organic component which may consume acid by any of several possible reactions, such as polymerization, condensation, oxidation, etc., when such ores are contacted with aqueous acids. The effect of inorganic alkalinity is by far the more prominent cause of acid consumption and has been previously recognized as a limitation in processing carnotite, pitchblende and similar ores. More recently we have found certain lignites which have an economically interesting (0.1 to 4%) uranium content, but these same ores are also rich in inorganic bases and organic components which consume large quantities of acid and make the conventional processing of this material with dilute sulfuric acid uneconomical. Even if the high acid consumption of such ores is peremptorily disregarded, treatment of lignite with aqueous solutions containing 5 to 10% of sulfuric acid apparently effects a condensation such that the uranium content is more tightly locked in the lignite than before acid contact, to the end that less uranium is extracted and the recovery process is impractical. The potential uranium value in lignite has stimulated the study of various approaches to the problem of uranium recovery. For example, drying and ashing of lignite and the conventional aqueous acid extraction of the ash has been proposed. However, this process, too, has not been commercially successful due to the added cost of calcining and because the resultant ash was high in alkalinity and had the uranium component in more firmly bound form.

Where high acid consumption has been found in treating carnotite and similar alkaline uranium ores, it has been suggested that sodium carbonate leaching would be more suitable. The recognized solubility of uranium in aqueous solutions of sodium carbonate together with the low cost of this reagent have recommended it for such use. However, when aqueous sodium carbonate extraction was attempted on raw lignite, pasty gels were obtained on mixing carbonate solution and lignite which were difficult to process and which did not give a practical recovery of uranium.

On the other hand, we have now found that lignites containing appreciable amounts (0.1% or more) of uranium can be processed in ground dry condition by extraction with selected solvents to recover a significant and practical part of their original uranium content as an aqueous extract from which uranium can be easily recovered as a salt or oxide.

The invention in essence resides in contacting a dry ground uraniferous ore, such as lignite in an uncalcined state, with a selective solvent comprising an aqueous solution of a lower molecular weight carbon acid, such as acetic ($CH_3COOH$) or carbonic acid ($HOCOOH$), which may in part be neutralized with ammonia or alkali metal bases and recovering an extract rich in uranium. In this manner there is recovered in one or more contactings, at least 90% of the original uranium content of the lignite ore. The obtained extracts are generally clear, easily filtered and light in color, evidencing a favorably low content of organic matter and at the same time a surprisingly high content of uranium compounds, permitting the recovery of uranium compounds in highly concentrated and purified form. In the preferred practice the extracting solvent contains a buffer salt such as alkali metal or ammonium acetate or bicarbonate added as such or formed in situ.

The process in more detail comprises the countercurrent contacting of a finely ground uraniferous ore, such as lignite, with an aqueous solution of bicarbonate salts which may contain free carbonic acid or of a carboxy organic acid, such as acetic acid, which solution may be buffered as by its ammonium or alkali metal salt. The solution should be at least 0.5 normal with respect to the acid anion and should be used in such ratios that the obtained ore slurry has a pH in the range above 2.3 and less than about 8. The contacting of ground dry lignite and extractant solution is effected in one or more mixing, settling, decanting or filtering operations using any of a number of effective solid-liquid mixing and separating means, such as turbo-mixers, Dorr classifiers and various decanting and/or filtering devices to separate and wash extracted solids and recover aqueous extracts and washings. The combined uraniferous extract and washings may be treated by any of a number of recognized means for recovering uranium compounds, each of which is based upon increasing the alkalinity (pH) of the extract from that of the stable uranium solution to that of an unstable uranium solution, thus effecting the precipitation and recovery of uranium compounds as solids. When the extract, for example, is made more alkaline by the addition of alkali metal hydroxides or ammonia, the uranium compounds are precipitated essentially quantitatively from the solution, facilitating their recovery by filtration, drying, etc. Alternatively, when a volatile acid is used as the extractant, the volatile acid can be taken off by distillation, causing the precipitation of uranium compounds from the residual aqueous and less acid medium. It is also possible to concentrate and recover the uranium compounds from a water-based solution by extraction with a selective solvent, such as tributyl phosphate in kerosene followed by aqueous re-extraction and precipitation as above.

Regardless of the specific method chosen to effect the recovery of uranium compounds from the aqueous extract, the process over all accomplishes the extraction of uranium from uncalcined lignite in concentrated form suitable for further processing.

The process of uranium recovery as carried out with a typical uncalcined lignite is illustrated in the accompanying flow sheet. As shown thereon, a uranium-bearing lignite ore is dried, when necessary, and in dried uncalcined condition is extracted (1) with an aqueous solvent of the type named in one or more batch or countercurrent contacting stages, over a significant interval of time to effect leaching of soluble uranium compounds from the ore. The separation of extracted solids from the aqueous extract is effected by filtration (2). The aqueous filtrate may be processed by one of several alternative methods depending upon the nature of the solvent. Where, as in Example I, the solvent is an aqueous solution of a volatile acid, such as acetic, alternative (A) may be used: the extract is distilled (3) to recover the volatile acid for recycle and recovering the uranium residue as separated solids on filtration (4). In another alternative embodiment (B), as in Example II, using acetic acid and sodium acetate, the extract is made more basic to a pH above 6 but not above about 10 by the addition of alkaline agents such as caustic to effect precipitation (5) of uranium compounds. The precipitate and accompanying liquid are separated by filtration (6). In yet another alternative (C), the rich aqueous extract is re-extracted (7) with a non-aqueous solvent selective for uranium salts, for example, kerosene containing dissolved tributyl phosphate, $(C_4H_9)_3PO_4$, with the resultant extract then "sprung" with water to separate an oily and an aqueous layer and further processing of the aqueous concentrate of uranium salts according to alternative (B) to recover uranium compounds of high purity.

The uranium compounds recovered as solids are the principal products of the process. The filtrates recovered in the separation of solid uranium compounds may be recycled in part, or first processed in one of several ways to recover useful components for recycle to the process. For example:

(a) Concentrated by distillation to remove excess water before recycling, or (b) Distillation with caustic where ammonia has been used as the alkalizing agent as in Example III, to effect the recovery of ammonia for reuse, or (c) Distillation with strong inorganic acids to effect the recovery of volatile organic acid for reuse, or (d) Where ammonium salts are present, the filtrate may be heated directly to recover volatile ammonia by dissociation of ammonium salts and acetic acid.

The process may be better understood by describing typical uranium recovery operations in the following examples in which specific steps in the process are numbered with reference to FIGURE 1.

EXAMPLE I

*Acetic Acid Extraction*

A uranium ore comprising 1.61% $U_3O_8$ in ground, dry, uncalcined condition was contacted (1) forcefully with an aqueous 80% acetic acid solution as the solvent in a turbo-mix agitator with spaced perforated blades moving relative to fixed baffles at about 3500 r.p.m. Extractant solution and solid were at a ratio of approximately 1 part of aqueous acid extractant to 1 part of solids. The aqueous extractant was heated to about 160° F. and the resultant slurry was kept at about this temperature after mixing by continued heat input. Continuous contact was maintained between the solids and liquid for about an average time of 6 hours. In a specific instance of this operation at 160° F.; when intimate contact was maintained in three such cycles totaling 18 hours, 90% of the initial uranium content was removed by extraction as assayed by analysis of the extract:

|  | Percent by weight |
|---|---|
| Initial $U_3O_8$ content in lignite | 1.61 |
| Final | 0.17 |
| Total removed by extraction | 1.44 |

$$\frac{1.44}{1.61} \times 100 = 90\% \text{ recovered}$$

The above extract was filtered (2) and, following alternative (A) on the attached flow sheet, fractionally distilled (3) to recover acetic acid for recycle and reuse. Removal of acetic acid by volatilization increased the pH to above 6, resulting in the precipitation of uranium compounds which were recovered by filtration (4).

While an acetic acid concentration of 80% is given above in Example I, lower concentrations may readily be used or, in some instances, even higher concentrations. It has been found that high concentrations of strong inorganic acids (pH below 2) promote the solution of alkaline earth metal salts as well as uranium compounds such that the extract becomes loaded with $Ca^{++}$, $Mg^{++}$, $Fe^{++}$, etc., cations. On the other hand, a carbon acid such as carbonic acid or carboxy acids such as acetic, lactic, propionic, etc., are weak acids even at high concentrations and give a more selective extraction of uranium with substantially less alkaline earth and other metal ions in solution than with inorganic acids. Thus, the acid concentration of the solvent may be quite high when carbonic or the described carboxy acids are used.

The concentration of solvents in water is limited at lower levels in a practical sense by the volume of solution requiring processing for the recovery of uranium compounds and by their lower efficiency of extraction. When a solvent containing as low an acid concentration as 9 grams of acetic acid per liter of solution was used under conditions similar to those of Example I, only 4% of the original uranium content of the charge was recovered in one extraction stage.

In Example I above, the extraction process was carried out at about 160° F. While this particular temperature does not appear to be critical, it is generally recognized that moderately elevated temperatures speed up the extraction process, which is set forth as the principal step in the process, i.e., an organic or inorganic component of lignite containing certain uranium values is contacted with an aqueous solution of a solvent in which it is soluble, either as the original uranium compound or in a simpler form as a uranium salt. Accordingly, solid-liquid contacting may be effected at room temperature but is preferably effected at moderately elevated temperatures of the order of 150 to 180° F. and preferably at about 160° F.

Similarly, the efficiency of extraction is benefited by intimate contact of the aqueous solvent and solid lignite and physical processes by which intimacy of contact is promoted have been found to be beneficial for the extraction of uranium. Particle size has a significant effect. Fine grinding of solid lignite gives improved extraction but comes up against the practical requirement of ready separation and filterability of extract after the contacting step has been completed. If the lignite particles are ground too fine, they tend to form colloidal suspensions in water, which are difficult and even impractical to separate. Grinding to finer than 200 mesh is not indicated and porous solids may even be in the form of coarse granules or pellets and still be effectively extracted with the aqueous reagents and at the temperatures indicated.

Contact time is also a significant factor controlling the completeness of uranium extraction and recovery. Contact time may be varied from a few minutes under optimum conditions to several hours under the usual conditions. It is generally recognized that the time interval during which solids are kept in contact with the extractant influences the completeness of extraction, though it is better to divide the total contact time into several shorter contact intervals wherein the solids are contacted with fresh solvent or a leaner solvent in each stage in essentially a countercurrent contact system than to carry one contact stage to complete equilibrium over a long period of time. Contact time, in general, varies with the temperature of extraction, being shorter at elevated temperatures for the same degree of extraction, and with particle size, being shorter when solids are at an optimum (small) size; the several factors of time, temperature and particle size may be adjusted to obtain the desired efficiency of uranium recovery at the optimum rate of throughput in the plant.

In an attempt to promote contact between the solution and ground lignite, surface tension reducing agents have been used. With ores rich in organic components, fine grinding tended to produce a material which was difficult to wet. When surface active agents were added, a reduction in wetting time was evident, though there was no notable improvement in the over-all efficiency of extraction. It is to be noted that when working with about 1 molar sodium carbonate solution and ground, dry lignite, direct agitation resulted in the formation of an unworkable paste and when 0.01% of a surface tension reducing agent (American Cyanamid OTS Sulfonate) was added, a considerable improvement in wetting was shown, though it did not overcome the gelling of the lignite-carbonate slurry.

EXAMPLE II

*Uranium Extraction With Acetic Acid and Sodium Acetate*

Following the process shown in the attached flow sheet, dry lignite from ore storage was processed in essentially the same manner as in Example I, except that the aqueous solvent was a composition comprising both acetic acid and sodium acetate. The equilibrium composition of aqueous extractant solution (including recycle acid and salt), was approximately as follows:

85 parts water
15 parts sodium acetate
20 parts acetic acid
---
120 parts (at 4.2 pH at 37° C.)
50 parts of dry, uncalcined lignite Solid and extractant liquid were agitated (1) and heated to 150° F., held under continuous agitation for one hour, allowed to settle, filtered (2) and the filter cake washed twice with 30 parts of water each time. The recovered extract and washings were at 4.5 pH and had a light tan color, as contrasted with black colored extract when either 10% (approximately 1 molar) sulfuric acid or 10% (approximately 1 molar) sodium carbonate was used as the extractant under similar conditions. The extract contained 55% of the initial 1.61% of $U_3O_8$ in the lignite. The acetic acid-acetate extract from filtration (2) was treated according to alternative (B), being made more basic to a pH above 6 by the addition of caustic. Beginning at pH 6.2, the solution became hazy and uranium salts began separating as a flocculent precipitate (5). Precipitation was continued with caustic addition to completion at a pH of about 10. An orange colored solid was separated by filtration (6) giving a filter cake of uranium compounds whose exact composition is unknown but which appears to be a basic uranium acetate.

The lignite residue from the above filtration containing 0.9% of $U_3O_8$ by analysis was recycled and mixed with fresh acetic acid-sodium acetate solution (1) by active agitation at 150° F. for 1.5 hours, settled, filtered, washed with 15% acetic acid solution and analyzed. The second extract and washings contained 17% of the original $U_3O_8$ content of the ore, or approximately 30% of the uranium remaining in the once extracted charge.

The solid residue from the second stage extraction containing 0.63% $U_3O_8$ was contacted (1) for a third time with fresh extractant for 18 hours at 150° F. The extract was separated by filtration (2) and, combined with two washings with 15% acetic acid, as above, accounted for 31% of the original $U_3O_8$ content of the lignite sample, or 0.50% $U_3O_8$ from the original 1.61% in the charge.

Over all, in three contacts encompassing a contact time of 20.5 hours, over 90% of the contained uranium was extracted and recovered as uranium compounds:

SUCCESSIVE THREE-STAGE EXTRACTION OF URANIUM FROM LIGNITE AT 150–160°F. WITH SODIUM ACETATE AND ACETIC ACID.

| | Wt. Percent $U_3O_8$ | Contact Time, Hr. | Percent Orig. $U_3O_8$ Extracted | Wt. Percent $U_3O_8$ Extracted | Wt. Percent $U_3O_8$ Residual |
|---|---|---|---|---|---|
| Original | 1.61 | | | | |
| 1st Contact | 1.61 | 1.0 | 44 | 0.71 | 0.90 |
| 1st Recycle | 0.90 | 1.5 | 17 | 0.27 | 0.63 |
| 2nd Recycle | 0.63 | 18 | 31 | 0.50 | 0.13 |

Over 3 contacts in 20.5 hrs.:

Percent $U_3O_8$
Original _____ 1.61
Final _____ 0.13
                                                 _____
Removed _____ 1.48
                                              =92% extraction Extracts from these contacting processes were precipitated at pH of about 6.2 to about 10 with added caustic (5) as the alkaline agent, thus effecting the recovery of basic uranium oxides or salts by filtration and washing (6). The filtrate from the uranium recovery step (6), containing sodium acetate, was recycled directly to the extraction unit until the concentration of buffer salt, sodium acetate, was built up to the above composition.

Alternatively, if desired, the filtrate from (6) may be concentrated by the removal of water by distillation before recycling with fresh acid. As a further alternative, the sodium acetate solution can be treated with a strong acid and distilled to recover the acetate values present as acetic acid for reuse as such.

EXAMPLE III

*Precipitation With Ammonia*

Following the process as shown in the attached FIGURE, a valuable modification of the processes of Example II is obtained by introducing ammonia to a pH of 9 as the alkalizing agent for precipitation (5) of uranium from the extract, giving an aqueous ammonium acetate solution as the filtrate from step (6). We have recycled and used this ammonium acetate advantageously in extraction (1) when fortified with fresh acetic acid. Thus, when the extracting solution comprised 12.5 wt. percent acetic acid and 9 wt. percent of ammonium acetate (fresh or recycled), the pH of the solution in contact with lignite was 4.5. Using 1 part of extractant to 1 part of uncalcined lignite and maintaining solid-liquid contact at 140–150° F. for 60 hours, the extract yielded as basic salts 68% of the original $U_3O_8$ charged. The residue from extraction separated on filtration (2), was recontacted with fresh solution at 140–150° F., and with successive contacts a recovery of over 90% of the original uranium ($U_3O_8$) was obtained.

It is to be noted that the above value of 90% is for uranium recovered as uranium compounds analyzed as $U_3O_8$ in process products, thus, including process losses, the process accounted for an extraction of over 90% of the original uranium values in the lignite. The continued addition of acetic acid and ammonia to the above process and the maintenance of an acetic acid/ammonium acetate ratio of about 12/9 dictates that parts of the ammonium acetate solution from filtration (6) be regularly withdrawn from the system. This stream is advantageously processed to recover chemicals for reuse by distillation (*a*) with caustic to recover ammonia vapor and water, (*b*) with inorganic acids to recover volatile organic acid, e.g., acetic acid for recycle, or (*c*) by thermal treatment to drive off ammonia.

The precipitate obtained on taking the above extract to a pH of 9 with ammonia was orange-brown in color. The filtrate was tested for any residual traces of uranium by the addition of caustic; a white precipitate was formed which contained no uranium but consisted entirely of calcium and magnesium hydroxides. The orange-brown precipitate (5) was calcined to remove a small amount of organic material present, giving a calcined product of yellow-orange color. The calcined product analyzed high in uranium value.

In the light of the successful extraction and recovery of uranium values from dry, uncalcined lignite by the combination of ammonium acetate and acetic acid and, with the further advantage of the cyclic use of a volatile base such as ammonia, the process of Example III is a preferred embodiment of the invention.

It has been recognized heretofore that uranium is readily leached from carnotite ores by sodium carbonate solution when uranium is in its highest valence state ($U^{+6}$). While it does not follow, a priori, that uranium in lignite is most readily leachable in its highest oxidized state ($U^{+6}$), we have found that oxidation, e.g., by air blowing, keeps uranium in at least the $U^{+4}$ state during extraction and does, in fact, give improved uranium recoveries. For example, in a single stage contacting of a sample of lignite with an equal weight of aqueous solution comprising sodium acetate, 10 wt. percent, and acetic acid, 12.5 wt. percent for 6 hours at 150° F., 61% of the original uranium was recovered when extraction was accompanied by air blowing, but only 49% of the original uranium was recovered when not accompanied by air blowing. This 25% gain in recovery of uranium is a substantial demonstration of the beneficial effect of oxidation accompanying extraction, though it is not essential to the process in general. Keeping uranium at a higher valence state of at least $U^{+4}$, or at the highest, $U^{+6}$, state can be accomplished by the use of other gaseous oxidants as well as air, such as ozonized air or oxygen, etc., or water soluble oxidants such as hydrogen peroxide solutions, sodium peroxide, potassium chlorate, lithium perchlorate, potassium permanganate, etc.

A series of short run tests was made in order to evaluate various solvents under near comparable conditions of time and temperature:

SINGLE-STAGE 6 HR. EXTRACTIONS OF LIGNITE
AT 140–150° F.

|  | Molar Conc. | Wt. Ratio, Solvent/Chg. | Percent of Orig. $U_3O_8$ Extracted |
| --- | --- | --- | --- |
| Acetic Acid | 1.0 | 1/1 | 22 |
| Do | 0.15 | 1/1 | 4 |
| Na Acetate | 0.15 | 1/1 | 2 |
| $NH_4$ Acetate | 0.15 | 1/1 | 1 |
| Na Acetate | 1.2 | } 1/1 | 61 |
| Acetatic Acid | 1.5 | | |
| Na Acetate | 1.0 | 1/1 | Gelled paste |
| Na Carbonate | 1.0 | 1/1 | Gelled paste |

From these data, there was an apparent minimum effective solvent concentration. With 0.15 molar acetic acid or its salts, the recovery of uranium was poor and impractical. Concentrations above 0.5 molar and in the order of about 1 to 2 molar were far more effective, while substantially higher concentrations have been found relatively less selective for uranium. A combination of acetic acid and its sodium or ammonium salt was apparently more effective than either acetic acid or its salts alone. With either 1 molar sodium acetate or carbonate at a 1/1 weight ratio of solvent to lignite, the slurries were extremely viscous or pasty and were considered unworkable. Further examination of this aspect of lignite extraction indicates that aqueous slurries of lignite are unstable at a pH of 8 or above. This may be due to the tendency of lignite (acidic) colloids to gel at 8 pH or under more basic conditions.

It is also to be noted from the data above that acetate salts in dilute aqueous solutions which in lignite slurries would be in the pH range of 7–8 are almost ineffective in the extraction of uranium. This is understandable in the light of Examples I, II and III wherein the uranium-acetic acid or the uranium-acetic acid-acetate extracts are shown to be stable at pH's below 6 but unstable, precipitating basic uranium acetate salts at pH's above 6.2 and up to a pH of 9–10. The extraction process, when employing acetic acid and/or acetates, is in a practical sense effected at pH of 6 or below and preferably at a pH of 4–5, while the uranium recovery from acetates by alkaline precipitation is effected at a pH above 6 and preferably in the pH range of 6 to 10.

To further define the conditions for the practical extraction of uranium with neutral or mildly alkaline solutions, solutions of sodium bicarbonate and carbonate were slurried with ground lignite and the physical condition and pH of the slurries noted.

LIGNITE EXTRACTION WITH BICARBONATE AND CARBONATE
[3/1 Solution/Lignite at Room Temperature]

| Solute | Molarity | Lignite Slurry | | Percent $U_3O_8$ Extraction, 6 Hr, Contact |
| --- | --- | --- | --- | --- |
| | | pH | Viscosity | |
| $NaHCO_3$ | 0.85 | 7.2 | low | 44 |
| $NaHCO_3$ | 0.43 | } 7.3 | low | 22 |
| $Na_2CO_3$ | 0.42 | | | |
| $Na_2CO_3$ | 0.85 | 7.6 | high | |

A notably good extraction was obtained with 0.85 molal sodium bicarbonate solution at a pH above 7. A one-stage contact in which 44% of the uranium was extracted with the slurry remaining non-viscous and workable mark this as a favorable demonstration of the process when carbonic acid neutralized with one equivalent of base was used in extraction. Thus, the aqueous solution may be used in the mildly basic pH range of 7 to 8 without gelling the lignite slurry. The solvent may, in fact, be an aqueous solution of bicarbonate salt with little free acid present without creating the pasty gels encountered with sodium carbonate. It is also to be noted that the neutralization of carbonic acid may go slightly beyond the monobasic salt with some carbonate present without producing viscous pasty unworkable slurries with lignite. However, from the relatively poorer extraction shown above with an equimolal mixture of bicarbonate and carbonate salts of carbonic acid (at a pH of 7.3), this ratio may be considered the practical limit of carbonate tolerance. We can accordingly characterize the aqueous solvents usable in the process as:

(a) Aqueous solutions of carbonic acid or lower molecular weight water soluble carboxylic acids, as free acids, having a pH of not less than 2.4;

(b) Aqueous solutions of salts of such carbon acids and alkali metal or ammonium hydroxide. In the case of dibasic acids, equimolar quantities of acid and base form the acid salt, such as sodium bicarbonate; mixtures of normal and acid salts such as that obtained using more than one and less than two mols of alkali metal or ammonium base per mol of acid are also usable up to the point that viscous slurries are obtained (above about 8 pH for the solvent-lignite slurry).

It is recognized that the pH for extraction of uranium salts from lignite when using aqueous solutions of monobasic ammonium or alkali metal salts of carbonic acid will be in the range of 7–8 and notably above the 4–5 pH level encountered with acetic acid and acetates without adversely affecting the quality of uranium extraction. However, when extraction of uranium is carried out with acids and/or buffer salts at the 7–8 pH level, the extracts will necessarily be processed for uranium recovery [by alternative (B)] at a higher pH level than that of extraction. For example, by being made more alkaline with the addition of alkalizing agents to precipitate uranium compounds in the pH range above 11–12; or [by alternative (C)] by extraction with a selective solvent and reconversion of the purified uranium compounds to an aqueous system for final treatment as in alternative (B).

While the invention has been described with reference to the extraction of uranium from an uncalcined lignite and particularly an ore having 1.61% uranium ($U_3O_8$), it is not limited to the processing of a specific lignite ore, but may be applied to any lignite varying in uranium content from about 0.10% to as high as 10+% of $U_3O_8$, from various geographic locations, whether from the Dakotas, Colorado, Wyoming, New Mexico or other domestic sources or from foreign sources. The lignite samples themselves may vary in color, texture, water content, mineral composition and organic content as well as in uranium content. Fragments may vary from coarse chunks to fine, powdery material. Some lignites are extremely wet as mined while others are apparently dry, though these, too, may contain appreciable amounts of adsorbed water. Typical lignites vary in texture from dense, hard, massive and sometimes spongy material, to friable, soft, crumbly material readily powdered in the hand. These materials as a class are generally readily fragmented so that foreign bodies may be removed by screening after fragmentation and before fine grinding for extraction. The organic material present in lignites may vary in color from jet black to yellowish-brown with varying shadings of red included. The organic material may, further, vary in lustre and texture from bright to dull. The inorganic content (as ash) may vary similarly from 30 to 60% by weight of the sample; from less than 0.2% to over 8% of sulfur, from about 1% to as much as 30% iron, with smaller amounts of arsenic, antimony, bismuth, copper and other minerals.

The process is also applicable to other uranium-containing carbonaceous or carboniferous ores, whether of later geological origin, such as peat, or earlier origin, such as shales, oil shales, sub-bituminous coals, etc. The lignite ores for processing are generally surface mined, stacked and blended to more or less uniform composites. In thus stacking and blending ligneous ores, a partial drying and fragmentation is effected prior to the grinding and slurrying as set forth in our extraction process.

The recovery of uranium from extracts of the type obtained with our selective solvents has been adequately described above in several alternative embodiments. Beyond the processes described for uranium recovery, control of the extraction process involves the analysis of solutions for their uranium content. Analysis of such extracts involves a number of steps, each of which has been standardized and is well known to those engaged in this field of work; for example—Kolthoff and Sandell, "Quantitative Inorganic Analyses," Chapter 38, MacMillan Co. Obviously, those trained in the art of analysis can readily follow these techniques to assay samples at various stages in the process and establish process control criteria according to which an effective extraction process can be operated.

Having thus described a process for the extraction and recovery of uranium from lignite and similar uraniferous ores, what is claimed is:

1. A process for recovering uranium values from mined lignite ores containing uranium which comprises contacting the uncalcined ore in comminuted state with an aqueous acidic solution containing at least 0.5 mol equivalents of a lower molecular weight carbon acid from the group consisting of carbonic and acetic acid to form a filterable slurry having a pH in the range of 2.3 to 6, separating the aqueous extract from the solids in the slurry, and recovering uranium from said extract.

2. The process set forth in claim 1 wherein said aqueous solution contains acetic acid and an alkali metal salt of such acid.

3. The process set forth in claim 1 wherein said aqueous solution contains acetic acid and ammonium acetate.

4. A process for recovering uranium values from mined lignite ores containing uranium which comprises contacting the uncalcined comminuted ore with an aqueous acidic solution containing at least 0.5 mol equivalent of acetic acid to form a filterable slurry having a pH in the range of 2.3 to 6, separating the aqueous extract from the solids in the slurry, precipitating solid uranium compounds from said extract by adjusting the pH to a level greater than 6 and recovering precipitated uranium compounds from said extract.

References Cited in the file of this patent

UNITED STATES PATENTS

| | | |
|---|---|---|
| 1,526,943 | Thews | Feb. 17, 1925 |
| 2,597,504 | Larsson | May 20, 1952 |
| 2,813,003 | Thunaes et al. | Nov. 12, 1957 |
| 2,896,930 | Menke | July 28, 1959 |

OTHER REFERENCES

Ewing et al.: BMI–237, July 31, 1950 (date declassified Apr. 11, 1956), pp. 23–25, 29–38.

Stephens et al.: Proceedings of the International Conference on the Peaceful Uses of Atomic Energy, Aug. 8–20, 1955, vol. 8, pages 18–25.